Jan. 13, 1953
L. F. WOUTERS
2,625,653
COINCIDENCE CIRCUIT
Filed Jan. 2, 1952
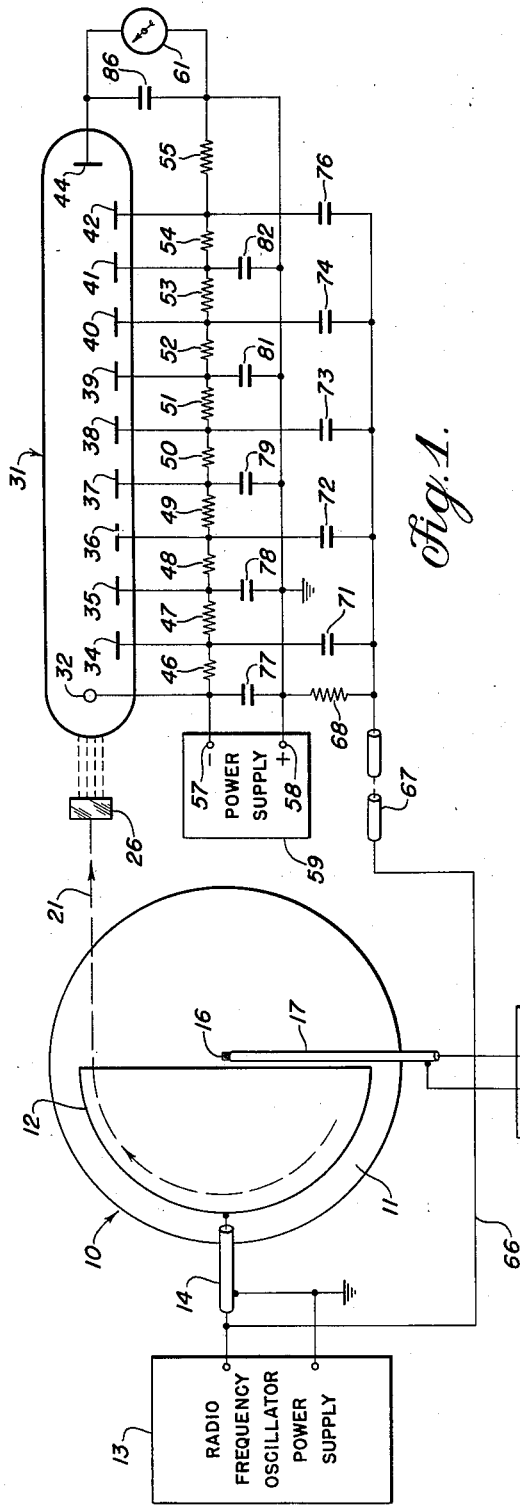
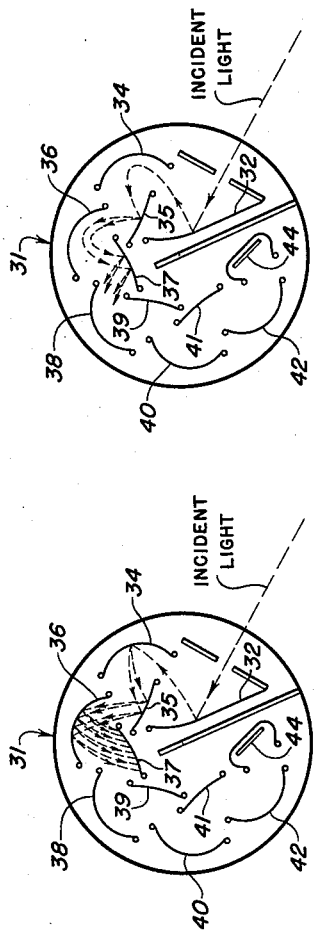
INVENTOR.
LOUIS F. WOUTERS
BY
Roland A. Anderson
ATTORNEY.

Patented Jan. 13, 1953

2,625,653

UNITED STATES PATENT OFFICE 2,625,653

COINCIDENCE CIRCUIT

Louis F. Wouters, Oakland, Calif., assignor to the United States of America as represented by the United States Atomic Energy Commission Application January 2, 1952, Serial No. 264,379

7 Claims. (Cl. 250—27)

This invention relates to a coincidence circuit and more particularly to an apparatus employing a photo-multiplier tube coincidence arrangement for determining the phase relationship between the accelerating radio-frequency voltage and the accelerated particles in a particle accelerator.

Numerous types of coincidence circuits have been developed; however, such circuits are generally complex arrangements of electronic elements and are not readily adaptable for use where a coincidence is to be detected between two different forms of energy, such as pulses of high energy particles and pulses of high frequency voltage. For example, in some applications of particle accelerators it is desirable, for optimum operation thereof, that the phase relationship between accelerated particles and acceleration voltage should be known. To make such a determination the present invention utilizes a scintillation crystal or liquid placed in the path of the accelerated charged particles and a photomultiplier tube disposed to receive light scintillations therefrom. Unidirectional voltages are applied to the dynodes of the photomultiplier tube in such a manner that the impressed potential between alternate dynodes is alternatively of a low and high value. Provision is then made to impress pulses of voltage proportional to the accelerating voltage upon the low voltage dynodes. Under such circumstance the output of the photomultiplier tube will be at a low level until a coincidence occurs between the two inputs to the tube whereby a high level operation results.

It is therefore an object of the present invention to provide a new and improved coincidence circuit.

Another object of the invention is to provide a new photomultiplier tube coincidence circuit.

Still another object of the invention is to provide a coincidence circuit wherein the elements of a photomultiplier tube are employed in detecting a coincidence between a pulse of light and a pulse of electrical energy.

A further object of the invention is to provide a coincidence circuit which normally operates at a low level in response to light energy focussed on the cathode of a photomultiplier tube and which operates at a higher level when a concurrent pulse of voltage is impressed upon alternate low voltage dynodes.

A still further object of the invention is to provide a photomultiplier tube having rated operating voltages applied to alternate dynodes and an associated circuit for applying an additional voltage to the other dynodes upon the occurrence of a predetermined change within such circuit.

Another object of the invention is to provide an apparatus for determining the phase relationship between the accelerating radio-frequency voltage and the accelerated particles of a particle accelerator.

Other objects and advantages of the invention will be apparent in the following description and claims considered together with the accompanying drawing, in which:

Figure 1 is a schematic wiring diagram of the invention;

Fig. 2 is a schematic diagram of a photomultiplier tube illustrating normal operation thereof; and Fig. 3 is a schematic diagram of the photomultiplier tube of Fig. 2 illustrating operation under conditions to be described hereinafter.

Referring to the drawing in detail, and Fig. 1 in particular, there is provided a conventional particle accelerator 10 of the cyclotron type having a magnet structure (not shown) including a pair of pole pieces 11 (only the lower of which is illustrated). Disposed between the pole pieces 11 is a vacuum chamber (not shown) within which a dee electrode 12 is positioned to form accelerating gaps for charged particles and which is excited by a radio-frequency oscillator power supply 13 through a cable 14. Centrally disposed with respect to the pole pieces 11 there is provided a source 16 of charged particles supplied suitable potentials by means of a cable 17 connected to a conventional injector power supply 18.

Since the structure of particle accelerators, such as the cyclotron 10, is well known in the art, a more enlarged description thereof is unnecessary for an understanding of the present invention. It will be readily apparent that certain control and instrumentation circuits have been omitted in the foregoing and this has been done for simplicity of explanation.

The operation of the cyclotron 10 is conventional, in that charged particles are inserted centrally between the pole pieces 11 in the evacuated tank by the injector source 16 and accelerated in a spiral path by the combined effect of the magnetic field between the poles and the potential of the dee electrode 12. Such acceleration continues until the particles attain a desired energy at which time the particles are removed as a beam 21 from the accelerator by the action of a conventional ejector means (not shown).

An indicator 26, comprising a material which scintillates when bombarded by charged particles, is placed in the path of the beam 21. To translate light scintillations of the indicator 26 into electrical energy, there is provided a multi-electrode photomultiplier tube 31 having a light-sensitive cathode 32 positioned to receive such light scintillations. In the embodiment of the invention illustrated in Fig. 1 of the drawing the photomultiplier tube 31 contains nine dynodes (numbered 34 to 42, inclusive, from the cathode 32 end of the tube) and an anode 44.

Ten series-connected resistors 46 to 55 are provided between the terminals 57 and 58 of a conventional unidirectional power supply 59 as a voltage divider with the resistor 46 connected to the negative terminal 57 and the resistor 55 connected to the grounded positive terminal 58 of the power supply. The resistor 46 and each alternate resistor 48, 50, 52, 54 have the same value of resistance, for example 30,000 ohms, while the resistors 47, 49, 51, 53, connected between the former resistors, and the resistor 55 have an equal value of resistance of higher value, for example 100,000 ohms, than such former resistors. The voltages of such voltage divider are connected to the electrodes of the photomultiplier tube 31 by connecting the cathode 32 to the junction between the resistor 46 and the negative terminal 57, the dynodes 34 to 42 in order to the successive junctions between the resistors 46 to 55, and the anode 44 to the junction between the resistor 55 and the grounded positive terminal 58 through an ammeter 61.

With the foregoing connections completed it will be readily apparent that a small voltage drop exists between the cathode 32 and the first dynodes 34, that a substantially larger voltage drop exists between the first dynode 34 and the second dynode 35, and that such voltage drop relationship exists in such order between the successive electrodes of the photomultiplier tube 31. Under such circumstances electrons freed at the cathode 32 are attracted to the first dynode 34 of the photomultiplier tube 31; however, before the electrons strike the first dynode the higher potential of the second dynode 35 attracts the electrons toward it and the electrons then strike such second dynode 35 with sufficient force to free a greater number of secondary electrons. Such greater number of electrons are, in turn, attracted toward the third dynode 36, but before striking thereon are attracted by the greater potential of the fourth dynode 37. The foregoing process is illustrated in Fig. 3 of the drawing, and it is readily apparent that under such circumstances the number of electrons reaching the anode is less than would be the instance where all of the dynodes had equal potential impressed thereon. The latter condition is illustrated in Fig. 2 of the drawing and will be referenced more fully hereinafter.

A lead 66 is connected at one end to the radio-frequency oscillator power supply 13 and at the other end to a coaxial cable 67 delay line. A resistor 68 is connected from the other end of the cable 67 to the grounded positive terminal 58 and affords a means for developing a voltage proportional to the output of the power supply 13. The junction between the cable 67 and the resistor 68 is connected to the first dynode 34 through a capacitor 71, to the third dynode 36 through a capacitor 72, to the fifth dynode 38 through a capacitor 73, to the seventh dynode 40 through a capacitor 74, and to the ninth dynode 42 through a capacitor 76. The junction between terminal 58 and the resistor 68 is connected to the cathode through a capacitor 77, to the second dynode 35 through a capacitor 78, to the fourth dynode 37 through a capacitor 79, to the sixth dynode 39 through a capacitor 81, and to the eighth dynode 41 through a capacitor 82. The value of each of such capacitors is selected to provide a radio-frequency path, for the radio-frequency voltage across the resistor 68, through each of the resistors 46, 48, 50, 52, 54 having low values of resistance. To complete the connections of the circuit there is provided a by-pass capacitor 86 connected across the ammeter 61.

Now considering the effect which the connections just described have upon the circuit as previously set forth, it will be apparent that a radio-frequency voltage will be developed across the resistor 68 which is delayed in time with respect to the voltage of the dee electrode 12 by the time constant of the cable 67. The radio-frequency voltage across the resistor 68 also appears across the resistors 46, 48, 50, 52, 54 having a low value of resistance, because of the capacitor in the circuit. Such radio-frequency voltage is added to the voltage due to the connections of the resistors to the power supply 59 so that the voltage of the normally low-voltage dynodes 34, 36, 38, 40, 42 is raised to substantially the normal impressed voltage of the other dynodes. During the time the voltage of each dynode is substantially the same value, that of the rated operating voltage for the particular photomultiplier tube used, electrons freed at the cathode 32 are attracted to the first dynode 34, from that dynode to the successive dynode 35, and successively from dynode to dynode until finally reaching the anode in greatly increased numbers, as illustrated in Fig. 2 of the drawing.

Thus, there is provided a coincidence circuit comprising the photomultiplier tube 31 and associated circuit connections. To understand the operation of such coincidence circuit when utilized in a combination to determine the phase relationship between acceleration voltage and accelerated particles in an accelerator it is necessary to consider the connections and relationship to the particle accelerator. With the accelerator 10 in operation the injector power supply 18 energizes the source 16 to insert into the evacuated tank a supply of charged particles. The radio-frequency oscillator power supply 13 then impresses a radio-frequency voltage upon the dee electrode 12 and at the same time upon the resistor 68. The particles will then travel in a spiral path because of the magnetic field between the pole pieces 11 and, if the phase of the particles and radio-frequency voltage of the dee electrode 12 is proper, the particles will be accelerated to a maximum energy. Should the particles cross the accelerating gap before or after the maximum positive value of the radio-frequency accelerating voltage the particles will not be properly accelerated. Now as the particles attain a desired maximum energy, the particles are ejected from the accelerator in the form of a beam 21, which may be more accurately described as a series of pulses of high energy particles.

The indicator 26 is disposed in the path of the particles 21 and light scintillations result when the particles strike the indicator. Such light scintillations then fall upon the light-sensitive cathode 32 of the photomultiplier tube 31 to free electrons therefrom. It will now be seen that two separate modes of operation may result depending upon the value of voltage appearing across the resistor 68 at the time electrons are released at the cathode 32. The value of the voltage across the resistor 68 is, in turn, dependent upon two factors, such as the time constant of the cable 67 and the value of the radio-frequency voltage itself. The latter may be adjusted in any conventional manner and it is only the former which will be discussed further. For accurate determinations of the phase relationship between the accelerating voltage and the particles it is necessary to determine the time required for the particles to travel from the final crossing of the gap of the dee electrode 12, to the indicator 26, and for the light scintillations therefrom to free electrons at the cathode 32 of the tube 31. Such time may be readily calculated for particles having the desired energy by taking into account the actual distance traveled and, having made the time determination, it is then necessary to delay the radio-frequency accelerating voltage at the resistor 68 by such time. From the foregoing, it will be readily apparent that by inserting a cable 67, which has a time delay constant equivalent to the time thus determined, the actual phase relationship between accelerating voltage and the particles of the accelerator will exist at the photomultiplier tube 31.

When the radio-frequency accelerating voltage is at a maximum value at the time the particles cross the accelerating gap of the dee electrode 12, the dynodes will have substantially the same potential differences impressed therebetween at the time electrons are freed at the cathode 32. Therefore the photomultiplier tube 31 will operate to amplify electron flow by a maximum amount, as illustrated in Fig. 2 of the drawing, and a maximum deflection will be obtained on the meter 61. Should the radio-frequency voltage lag or lead the particles at the tube 31, the voltages on the alternate dynodes will have a lesser value, and the tube will operate in the manner illustrated in Fig. 3 of the drawing, so that less than maximum deflection will be obtained on the meter 61. In the latter instance it will be readily apparent that the amount of phase difference may be determined by altering the delay time of the cable 67 from the calculated value to obtain maximum deflection on the meter 61.

It has been found that the invention as described in the foregoing will be operable where the frequency of the radio-frequency accelerating voltages is 10 megacycles or less. For frequencies of a higher value, it is necessary to consider the transit times of the electrons between the dynodes. Compensation for such transit time may be readily applied by inserting delay lines, having suitable time constants, in the dynode circuits.

While the salient features of the present invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a coincidence circuit, the combination comprising a photomultiplier tube having a cathode, a plurality of dynodes, and an anode, a source of light disposed adjacent said cathode, a plurality of series-connected resistors having one end connected to said cathode, the other end connected to said anode, and the junctions therebetween respectively connected to said dynodes, alternate resistors of said series-connected resistors having an equal value substantially less than the equal value of the remaining resistors, power supply means connected across said series-connected resistors, and means for coupling a recurring voltage across said alternate resistors whereby maximum current flows at said anode when said light and the maximum value of said recurring voltage occur simultaneously.

2. In a coincidence circuit, the combination comprising a photomultiplier tube having a cathode, a plurality of dynodes, and an anode, a source of light disposed adjacent said cathode, a voltage divider connected between said cathode and anode, power supply means connected across said voltage divider, said dynodes being connected to intermediate points of said voltage divider whereby less than operating voltage is applied to the first and each alternate dynode thereafter and full operating voltage is applied to the remaining dynodes, a source of recurring voltages, the means connected between said source and said first and each alternate dynode for coupling the recurring voltages thereto whereby maximum current flows at each anode when said light and the maximum value of said recurring voltage occur simultaneously.

3. In a coincidence circuit, the combination comprising a photomultiplier tube having a cathode, a plurality of dynodes, and an anode, a source of light disposed adjacent said cathode, a plurality of series-connected resistors having one end connected to said cathode, the other end connected to said anode, and the junctions therebetween respectively connected to said dynodes, alternate resistors of said series-connected resistors having an equal value substantially less than the equal value of the remaining resistors, power supply means connected across said series-connected resistors with the negative terminal connected to said cathode and the grounded positive terminal connected to said anode, a source of recurring voltage, and capacitive means coupling the voltage of said source across each of said resistors having a lesser value whereby maximum current flows at said anode when said light and the maximum value of said recurring voltage occur simultaneously.

4. In a coincidence circuit, the combination comprising a photomultiplier tube having a cathode, a plurality of dynodes, and an anode, a source of light disposed adjacent said cathode, a plurality of series-connected resistors having one end connected to said cathode, the other end connected to said anode, and the junctions therebetween respectively connected to said dynodes, alternate resistors of said series-connected resistors having an equal value substantially less than the equal value of the remaining resistors, a unidirectional power supply connected across said series-connected resistors with the negative terminal connected to said cathode and the grounded positive terminal connected to said anode, a source of alternating voltage, and a plurality of capacitors respectively connected between each side of said source of alternating voltage and either end of said resistors having a lesser value for impressing the voltage of said source thereacross whereby maximum current flows at said anode when said light and the maximum value of the alternating voltage of said source occur simultaneously.

5. In a phase detector for a particle accelerator having an accelerating electrode connected to a source of radio-frequency accelerating voltage, the combination comprising a scintillation indicator disposed in the path of particles from said accelerator, a photomultiplier tube having a cathode, a plurality of dynodes, and an anode, said cathode being disposed to receive scintillations from said indicator, a unidirectional power supply, a voltage divider connected across said power supply, the electrodes of said photomultiplier tube benig connected to points of said voltage divider whereby alternate dynodes are impressed with less than operating voltage and the remainder with full operating voltage, and delay means connected between said source of radio-frequency accelerating voltage and said alternate dynodes whereby maximum current flows at said anode when said scintillations and the maximum value of the radio-frequency voltage of said source occur simultaneously.

6. In a phase detector for a particle accelerator having an accelerator electrode connected to a source of radio-frequency accelerating voltage, the combination comprising a scintillation indicator disposed in the path of particles from said accelerator, a photomultiplier tube having a cathode, a plurality of dynodes, and an anode, said cathode being disposed to receive scintillations from said indicator, a voltage divider having a plurality of resistors connected at one end to said cathode and at the other end to said anode through an ammeter, the values of said resistors being selected to alternately have a lesser value of resistance than the remaining resistors and the junctions between such resistors being respectively connected to said dynodes, a section of coaxial delay cable connected at one end to said source of radio-frequency accelerating voltage, and a plurality of capacitors connected between the other end of said coaxial delay cable and said resistors of lesser value whereby maximum deflection is obtained in said ammeter when said scintillations and the maximum value of the radio-frequency accelerating voltage of said source occur simultaneously.

7. The combination of claim 6 wherein the time constant of said coaxial delay cable is selected to substantially the time of flight of particles between the accelerating electrode and the indicator plus the time between a scintillation of the indicator and the freeing of electrons at the cathode of the photomultiplier tube.

LOUIS F. WOUTERS.

REFERENCES CITED

The following references are of record in the file of this patent:

UNITED STATES PATENTS

| Number | Name | Date |
| --- | --- | --- |
| 2,756,661 | Wouters | Nov. 27, 1951 |
| 2,610,303 | Bell | Sept. 9, 1952 |